(12) United States Patent
Kobayashi

(10) Patent No.: US 12,730,331 B2
(45) Date of Patent: Sep. 8, 2026

(54) DIFFRACTIVE OPTICAL ELEMENT, OPTICAL SYSTEM, IMAGE PICKUP APPARATUS, AND DISPLAY APPARATUS

(71) Applicant: CANON KABUSHIKI KAISHA, Tokyo (JP)

(72) Inventor: Mikio Kobayashi, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 302 days.

(21) Appl. No.: 18/401,763

(22) Filed: Jan. 2, 2024

(65) Prior Publication Data

US 2024/0264458 A1 Aug. 8, 2024

(30) Foreign Application Priority Data

Jan. 27, 2023 (JP) ................................ 2023-010722

(51) Int. Cl.
*G02B 27/42* (2006.01)

(52) U.S. Cl.
CPC ................................ *G02B 27/4205* (2013.01)

(58) Field of Classification Search
CPC ............ G02B 27/4205; G02B 27/4211; G02B 27/4216; G02B 27/0056
See application file for complete search history.

(56) References Cited

U.S. PATENT DOCUMENTS 9,777,990 B2 * 10/2017 Arai .......................... F41G 1/38
10,890,698 B2 * 1/2021 Kobayashi ........... G02B 5/1871
2022/0221687 A1 7/2022 Kobayashi
2022/0221690 A1 7/2022 Kobayashi
2023/0288665 A1 9/2023 Kobayashi

FOREIGN PATENT DOCUMENTS

JP 2008310160 * 12/2008
JP 2008310160 A * 12/2008
JP 2009-217139 A 9/2009
JP 2010-532496 A 10/2010
WO 2010/032347 A1 3/2010

OTHER PUBLICATIONS

Notice of Reasons for Refusal issued by the Japanese Patent Office on Sep. 30, 2025 in corresponding JP Patent Application No. 2023-010722, with English translation.

* cited by examiner

*Primary Examiner* — Nathanael R Briggs
(74) *Attorney, Agent, or Firm* — Carter, DeLuca & Farrell LLP

(57) ABSTRACT

A diffractive optical element includes a diffractive area including annular sections concentrically arranged. At least one of the annular sections has a non-circular shape. A predetermined inequality is satisfied.

16 Claims, 9 Drawing Sheets

DIFFRACTIVE OPTICAL ELEMENT, OPTICAL SYSTEM, IMAGE PICKUP APPARATUS, AND DISPLAY APPARATUS

BACKGROUND

Technical Field

One of the aspects of the embodiments relates to a diffractive optical element, an optical system, an image pickup apparatus, and a display apparatus.

Description of Related Art

Japanese Patent Laid-Open No. 2009-217139 discloses a diffractive optical element (DOE) that has high diffraction efficiency over the entire visible range by laminating diffraction gratings made of two different materials. PCT International Publication No. WO 2010/032347 discloses a DOE that improves diffraction efficiency by closely forming a diffraction grating made of another material onto a diffraction grating made of an injection molding material.

The DOE disclosed in Japanese Patent Laid-Open No. 2009-217139 is expensive because a diffraction grating is formed on a substrate using a mold and the number of molding processes increases. The DOE disclosed in PCT International Publication No. WO 2010/032347 can be manufactured at low cost but a lens has a so-called D-cut shape in which the lens is partially cut for miniaturization, the molding process is likely to fail.

SUMMARY

A diffractive optical element according to one aspect of the embodiment includes a diffractive area including annular sections concentrically arranged. At least one of the annular sections has a non-circular shape. The following inequality is satisfied:

$$6 < P\min \times Rdc / Re < 65$$

where Rdc (mm) is a shortest one of distances from a center of the annular sections to an outer circumference of the diffractive area, Re (mm) is a radius of one of the annular sections which is farthest from the center, and Pmin (μm) is a minimum value of an array pitch of the diffractive optical element. An optical system, an image pickup apparatus, a display apparatus each having the above diffractive optical element also constitute another aspect of the embodiment.

Further features of the disclosure will become apparent from the following description of embodiments with reference to the attached drawings.

DESCRIPTION OF THE EMBODIMENTS

Referring now to the accompanying drawings, a detailed description will be given of embodiments according to the disclosure.

Example 1

Figures 1A, 1B:
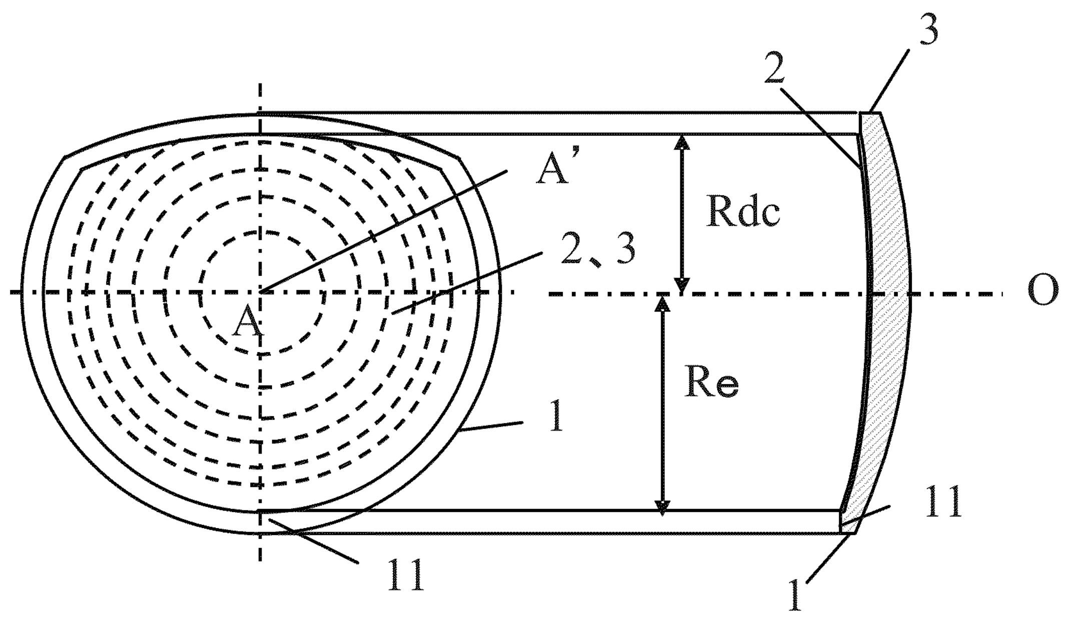
FIGS. 1A and 1B are a front view and a side view of a DOE according to any one of Examples 1 to 4.
Figure 2:
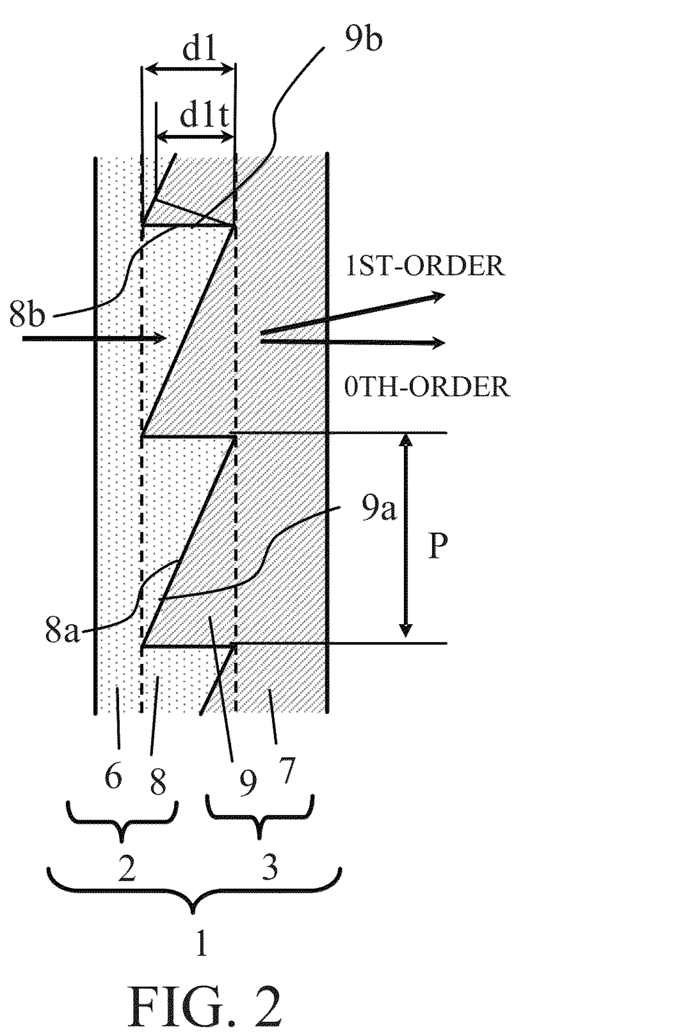
FIG. 2 is a partial sectional view of the DOE according to any one of Examples 1 to 4.

Referring now to FIGS. 1A, 1B, and 2, a description will be given of a diffractive optical element (DOE) 1 according to Example 1. FIG. 1A is a front view of the DOE 1. FIG. 1B is a side view of the DOE 1. FIG. 2 is a partial sectional view of the DOE 1 taken along a line A-A' in FIG. 1A. FIG. 2 is a diagram deformed in the grating depth direction.

The DOE 1 includes a second element portion 3 having a sufficient thickness and optical (refractive) power on an optical axis O, a first element portion 2 having a thin thickness in close contact with each other, and a diffraction grating formed between the first element portion 2 and the second element portion 3. The DOE 1 includes a first diffraction grating 8 made of a first material, and a second diffraction grating 9 made of a second material different from the first material. The first diffraction grating 8 and the second diffraction grating 9 are layered in close contact with each other via the grating surfaces (grating slopes and grating wall surfaces).

As illustrated in FIG. 2, the first element portion 2 includes a first grating forming layer including a grating base portion 6 and the first diffraction grating 8 integrated with the grating base portion 6. Similarly to the first element portion 2, the second element portion 3 includes a second grating forming layer including a grating base portion 7 and the second diffraction grating 9 integrated with the grating base portion 7. The first diffraction grating 8 and the second diffraction grating 9 are layered in close contact with each other because grating slopes (diffraction slopes) 8*a* of the first diffraction grating 8 and grating slopes (diffraction slopes) 9*a* of the second diffraction grating 9 closely contact each other, and the grating wall surfaces 8*b* of the first diffraction grating 8 and the grating wall surfaces 9*b* of the second diffraction grating 9 closely contact each other. In this example, the first element portion 2 and the second element portion collectively act as one DOE 1.

The first diffraction grating 8 and the second diffraction grating 9 each have a concentric (rotationally symmetrical) grating shape and a lens effect because the grating pitch changes in the radial direction. That is, the DOE 1 has a plurality of annular areas (annular zones) with different array pitches in the radial direction (a diffractive area including a plurality of annular section concentrically arranged). In addition, as illustrated in FIG. 1A, in the DOE 1 according to this example, the annular areas include a (perfectly) annular area whose circumference is wholly maintained (is not cut) and a non-circular (partially missing) annular area whose circumference is partially cut and has a so-called D-cut outline (a portion of at least one of the annular sections is lacked). In this embodiment, concentric circles include a case where a center of an annulus formed by supplementing the missing portion of the annulus whose circumference is partially cut coincides with a center of another (perfectly) annular area that is not partially cut. Further, "rotationally symmetrical" is applied to a case where the center of the annulus formed by supplementing the missing portion of the annulus whose circumference is partially cut is rotationally symmetrical.

The DOE 1 has an outer peripheral area 11 in which no diffraction grating is formed outside an area having a radius Re from the optical axis O (center of the annular area). The outer peripheral area 11 is integrally molded in forming the second diffraction grating 9. In this example, the wavelength region of light incident on the DOE 1, that is, the use wavelength region is the visible region, and the materials and grating thicknesses of the first diffraction grating 8 and the second diffraction grating 9 are selected throughout the visible region so as to increase the diffraction efficiency of the first-order diffracted light.

A description will now be given of the specific configuration of the DOE 1. In the DOE 1 according to this example, a first material of the first diffraction grating 8 is an episulfide resin (Nd=1.6731, νd=36.4, θgF=0.584). A second material of the second diffraction grating 9 is a polycarbonate thermoplastic resin (Nd=1.6160, νd=25.8, θgF=0.623).

In this example, the Abbe number νd based on the d-line and the partial dispersion ratio θgF are defined in the generally used manner. The Abbe number νd and the partial dispersion ratio θgF are expressed by the following equations (a) and (b):

$$\nu d=(Nd-1)/(NF-NC) \tag{a}$$

$$\theta gF=(Ng-NF)/(NF-NC) \tag{b}$$

where Nd, NF, NC, and Ng are refractive indices for the d-line (587.6 nm), the F-line (486.1 nm), the C-line (656.3 nm), and the g-line (435.8 nm) in the Fraunhofer line, respectively.

The thickness of the second element portion (lens portion) 3 on the optical axis O is 3.5 mm, and the outer diameter is 43 mm. The thickness of the first element portion (lens portion) 2 on the optical axis O is 0.15 mm. The interface between the second element portion (lens portion) 3 and the first element portion (lens portion 2) and the surface of the first element portion 2 facing the air have substantially the same central radius of curvature.

A phase shape P of each diffractive surface of the DOE according to each numerical example is expressed by the following equation (c):

$$P(h)=(2\pi/m\lambda_0)(C_2h^2+C_4h^4+C_6h^6 \ldots) \tag{c}$$

where h is a height in a direction perpendicular to optical axis O, m is a diffraction order of diffracted light, $\lambda_0$ is a design wavelength, and ci is a phase coefficient (i=2, 4, 6 . . . ).

An optical path difference function Ψ of the diffractive surface is expressed by the following equation (d):

$$\Psi(h)=C_2h^2+C_4h^4+C_6h^6 \ldots \tag{d}$$

Power φd on a grating surface of a diffraction grating for an arbitrary wavelength λ and arbitrary diffraction order m can be expressed by the following equation (e) using the lowest-order phase coefficient $C_2$:

$$\varphi d=-2C_2m\lambda/\lambda_0 \tag{e}$$

The focal length fd on the grating surface of the diffraction grating is expressed by the following equation (f):

$$fd=1/\varphi d \tag{f}$$

In each numerical example, the diffraction order m of each diffraction grating constituting the DOE is all 1, and the design wavelength $\lambda_0$ is the wavelength of the d-line (587.56 nm).

The phase coefficients of the DOE 1 according to this example are $C_2$=−9.271E-04, $C_4$=1.051E-06, C6=−1.382E-09, a focal length fd on the diffractive surface is 539 mm, a radius Re of an outermost annulus is 19.40 mm. The expression "E±Z" means "$10^{\pm Z}$".

The DOE 1 according to this example is intended to have a configuration that can be manufactured at low cost. Therefore, the second element portion 3 having the second diffraction grating 9 having a large thickness may be formed by integral molding using a mold. More specifically, in a case where the second element portion 3 is formed using injection molding and a thermoplastic material as the material of the second diffraction grating 9, the lens shapes of the second diffraction grating 9 and the second element portion 3 can be highly accurately obtained. After the second element portion 3 having the diffraction slopes 9*a* is formed, another resin material is applied onto the diffraction slopes 9*a* and cured, so the DOE 1 can be obtained in which the first element portion 2 having the first diffraction grating 8 is closely layered. At that time, using an ultraviolet curable resin or the like as the material of the first diffraction grating 8 facilitates manufacturing of the DOE with a desired cured grating shape.

Referring now to FIG. 2, a description will be given of a relationship between a phase difference and diffraction efficiency of the DOE 1 according to this example. In the DOE 1, the condition that maximizes the diffraction efficiency of diffracted light of diffraction order m is that the optical path length difference $\Phi(\lambda)$ satisfies the following equation (g) at a wavelength $\lambda$.

$$\Phi(\lambda) = -(n02 - n01)\times d1 = m\lambda \quad \text{(g)}$$

where n02 is the refractive index of the material of the second diffraction grating 9 for light at the wavelength $\lambda$, n01 is the refractive index of the material of the first diffraction grating 8 for the light at the wavelength $\lambda$, and d1 is a grating height (grating thickness) of the first diffraction grating 8 and the second diffraction grating 9.

In FIG. 2, assume that the diffraction order of light diffracted downward from the 0th-order diffracted light is a negative diffraction order, and the diffraction order of light diffracted upward from the 0th-order diffracted light is a positive diffraction order. In that case, in the case of a diffraction grating having a grating shape in which the grating thickness of the first diffraction grating 8 on the incident side increases from the bottom to the top in FIG. 2, the sign of the grating height d1 in equation (g) is positive.

The diffraction efficiency $\eta(\lambda)$ at an arbitrary wavelength $\lambda$ is expressed by the following equation (h):

$$\eta(\lambda) = \mathrm{sinc}^2[\pi\{m - \Phi(\lambda)/\lambda\}] \quad \text{(h)}$$

In equation (h), m is the order of the diffracted light to be evaluated, and $\Phi(\lambda)$ is an optical path length difference in one unit cell of the DOE for the light of wavelength $\lambda$. sin c(x) is a function expressed by {sin(x)/x}. The design wavelength d of the DOE 1 according to this example is 587.56 nm. This is similarly applied to the following examples. A design wavelength has a value near the average value of the use wavelengths of the DOE, and more specifically, the following equation (1) is established:

$$0.9 < \lambda d/\lambda ave < 1.1 \quad (1)$$

where $\lambda$ave (nm) is the average value of the use wavelengths.

The DOE 1 according to this example is used in the visible range, the wavelength used is 400 nm to 700 nm, and $\lambda$ave is 550 nm. In the DOE 1 illustrated in FIG. 2, the diffraction efficiency is highest in the visible wavelength range in the case of minimum value of array pitch Pmin of 100 μm and the grating height d1 of 10.01 km.

The grating wall surface 8*b* of the first diffraction grating 8 does not need to be perpendicular to the enveloping line connecting the vertex portions of the first diffraction grating 8, and can be angled according to the incident angle of the light ray. As illustrated in FIG. 2, in the diffraction grating in which the grating wall surface 8*b* is angled to the enveloping line connecting the vertex portions of the first diffraction grating 8, d1t is a distance between the enveloping line connecting the vertex portions of the first diffraction grating 8 and the grating vertex.

In this example, the first diffraction grating 8 and the second diffraction grating 9 are made of different materials. For example, the second diffraction grating 9 is made of a low-refractive-index high-dispersion material, and the first diffraction grating 8 is made of a high-refractive-index low-dispersion material that has a higher refractive index. The following inequality (2) may be satisfied to acquire high diffraction efficiency:

$$1.0 < (N1 - N2)/(1/\nu 2 - 1/\nu 1) < 20.0 \quad (2)$$

where N1 and N2 are refractive indices of the materials of the first diffraction grating 8 and the second diffraction grating 9 for the d-line, respectively, and ν1 and ν2 are Abbe numbers of the material of the first diffraction grating 8 and the second diffraction grating 9 based on the d-line.

Inequality (2) may be replaced with inequality (2a) below:

$$1.2 < (N1 - N2)/(1/\nu 2 - 1/\nu 1) < 18.0 \quad \text{(2a)}$$

Inequality (2) may be replaced with inequality (2b) below:

$$1.5 < (N1 - N2)/(1/\nu 2 - 1/\nu 1) < 15.0 \quad \text{(2b)}$$

Figure 3:
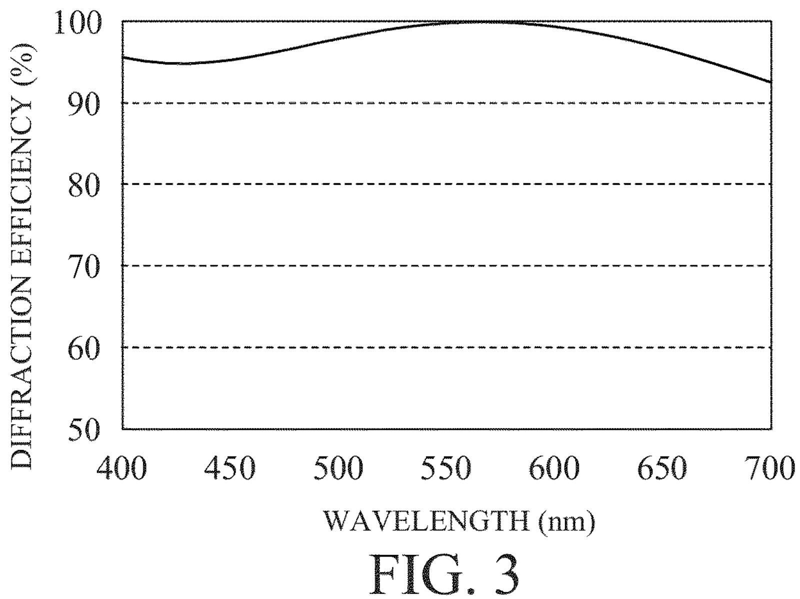
FIG. 3 illustrates a relationship between diffraction efficiency and wavelength in Example 1.

FIG. 3 illustrates the diffraction efficiency of the DOE 1 according to this example in an annulus in which the minimum array pitch is 21.0 μm and the grating height d1 is 10.42 μm. In FIG. 3, a horizontal axis represents a wavelength (nm), and a vertical axis represents diffraction efficiency (%). At this time, the angle formed between the envelope connecting the vertex portions of the diffraction grating on the grating wall surfaces and the perpendicular is 5.4 degrees, and d1t is 9.96 μm. As illustrated in FIG. 3, the configuration that satisfies equation (2) can provide high diffraction efficiency in a wide visible wavelength range.

A description will be given of the D-cut shape in the DOE 1 according to this example. For example, the DOE 1 in a binocular optical system (observation optical system) causes the outer diameter of the lens to be large if the viewing angle of the optical system is widened. The binocular observation optical system maintains the interpupillary distance to be a constant distance and requires the space between the binocular lenses to be small. Since it is necessary to place a member such as a nose pad between the lenses for both eyes, it is necessary to secure space by partially cutting the lenses.

In a case where a concentric diffraction grating is formed like the DOE 1 according to this example and the lens is partially cut out, the annulus of the diffraction grating is partially cut or disconnected. Even if the annulus is partially cut or disconnected by the D-cut shape portion or the like, it is defined as an annulus in this example as long as it has a concentric structure.

As mentioned above, in order to achieve a low-cost structure of the DOE 1 according to this example, the second diffraction grating 9 having a large volume is produced by injection molding. At that time, in the annulus where the circumference is partially missing (D-cut portion where the annulus is partially cut or disconnected), the grating shape is disconnected, so it is difficult to form the desired shape due to stress concentration during molding, etc.

In addition, in forming the second diffraction grating 9 by injection molding, it is important for molding to have a structure that is easy to release from the mold by having an outer area having no diffraction grating outside the area with the annuli. In that case, the mold structure can be made simpler by providing a step between the D-cut portion and the area outside it, but if the structure has a step in the D-cut portion, the resin may accumulate during molding etc., and therefore stress concentration during molding is likely to occur. In particular, as the array pitch becomes narrower, molding becomes difficult.

The DOE 1 according to this example is formed by applying the first diffraction grating 8 to the second diffraction grating 9 and curing it. Therefore, as the distance between adjacent annuli in the D-cut portion becomes narrower, stress concentration increases near the annuli, and causes peeling between the first diffraction grating 8 and the second diffraction grating 9.

Figures 4A, 4B:
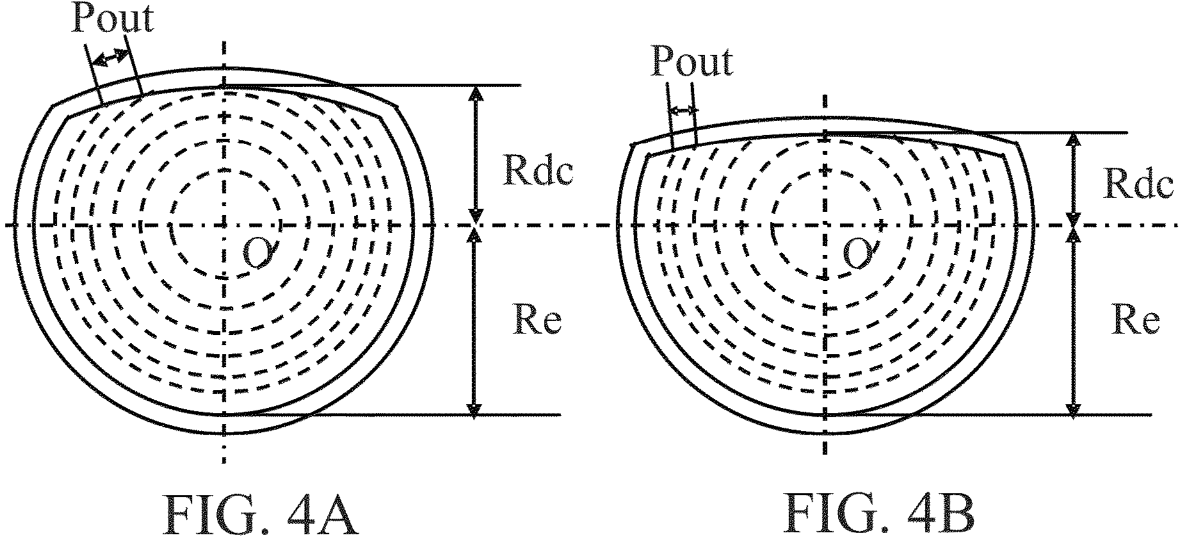
FIGS. 4A and 4B schematically illustrate outlines of the DOEs according to Example 1.

FIGS. 4A and 4B schematically illustrate different widths of the D-cut portion from the center of the annuli (optical axis O). The shortest distance Rdc from the center to the outer circumference of the annular areas (diffractive area) is smaller in the DOE in FIG. 4B than that of the DOE in FIG. 4A. In the configuration in which the shortest distance Rdc is small, interval Pout between the annular ends is narrower in the configuration of FIG. 4B than that in the configuration of FIG. 4A in the portion where the annulus is partially cut or disconnected (D-cut portion). Therefore, stress concentration is likely to occur during molding, and moldability becomes difficult.

Figure 5A:
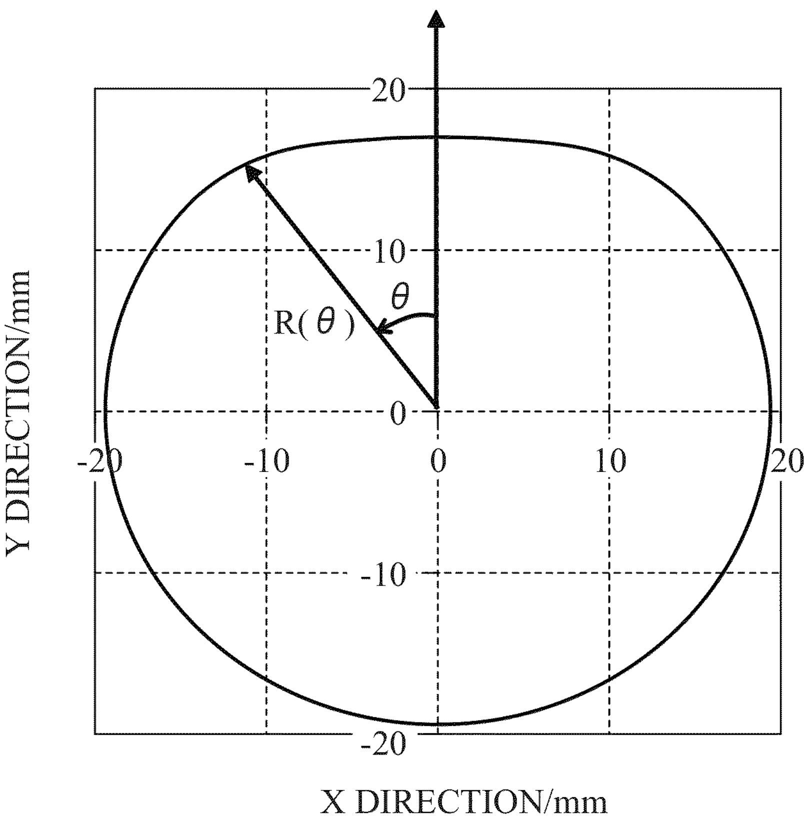
FIGS. 5A and 5B illustrate the outline of the DOE according to Example 1.
Figure 5B:
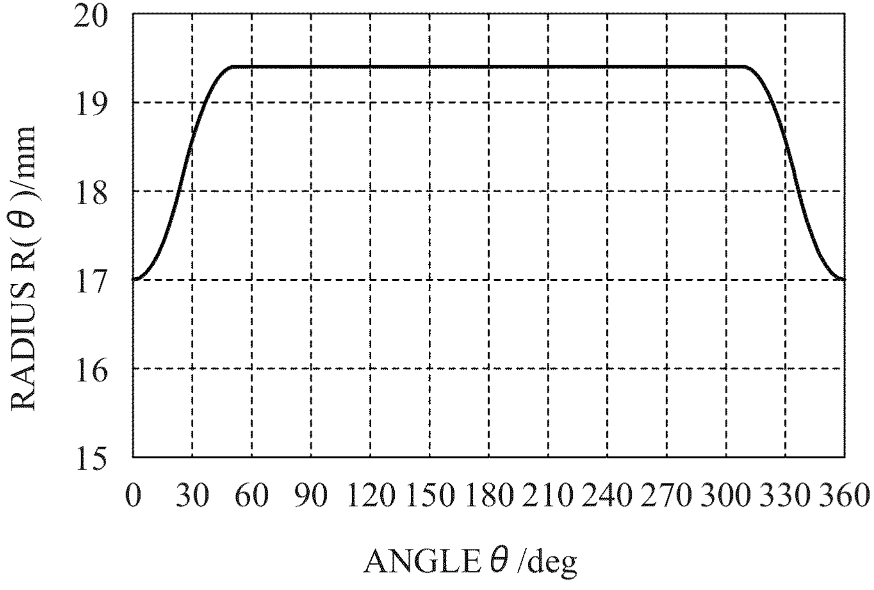

FIG. 5A illustrates a range of the outline of the area having annuli in this example. FIG. 5B illustrates the distance (radius R) from the center of the outline of FIG. 5A as a function of an angle θ against the optical axis. In FIG. 5B, the horizontal axis represents the angle θ (deg), and the vertical axis represents the radius R (mm). As illustrated in FIGS. 5A and 5B, the DOE according to this example can reduce the size of the optical system by shortening the distance between the center of the annuli and the outer diameter around θ=0 degrees. More specifically, the shortest distance Rdc is set to 17.0 mm.

As described above, the DOE according to this example has annular areas in which a plurality of rotationally symmetric (concentric) annuli are formed. The DOE has annular areas including an annulus in which the circumference is maintained and an annulus in which the circumference is partially cut or disconnected, and has an outline of a so-called D-cut portion. The following inequality (3) is satisfied:

$$6 < Pmin \times Rdc/Re < 65 \tag{3}$$

where Rdc (mm) is the shortest distance from the center of the annuli to the outer circumference of the annular area, Re (mm) is a radius of the annulus farthest from the center among the plurality of annuli, and Pmin (μm) is a minimum value of the array pitch of the DOE 1.

Here, the shortest distance Rdc refers to the distance between the center (rotation center of the annulus) and the envelope that connects the annular ends where the annulus is partially cut or disconnected in an outline that is not rotationally symmetrical. In other words, the shortest distance Rdc is the distance from the center to the farthest one of the plurality of annuli in which the circumference is not cut. Properly setting the minimum value Pmin of the array pitch and the distance from the center of the annulus of the D-cut portion so as to satisfy inequality (3) can widen the interval Pout between the annular ends can be widened and improve moldability, and a proper diffraction pitch can provide a high chromatic aberration correction effect.

In a case where the value becomes lower than the lower limit of inequality (3), the interval Pout between the annular ends in the D-cut portion becomes narrower, and moldability lowers. In a case where the value becomes higher than the upper limit of inequality (3), the width of the distance Rdc increases and it becomes difficult to reduce the size of the optical system, or the diffraction pitch (minimum value of the array pitch) increases and correcting the chromatic aberration of the optical system becomes insufficient.

Inequality (3) may be replaced with inequality (3a) below:

$$9 < Pmin \times Rdc/Re < 55 \tag{3a}$$

Inequality (3) may be replaced with inequality (3b) below:

$$11 < Pmin \times Rdc/Re < 45 \tag{3b}$$

In this embodiment, the following inequality (4) may be satisfied:

$$0.50 < Rdc/Re < 0.95 \tag{4}$$

In a case where the value becomes lower than the lower limit of inequality (4), the interval Pout between the annular ends in the D-cut portion becomes narrower, and moldability lowers. In a case where the value becomes higher than the upper limit of inequality (4), the width of the distance Rdc increases, and it difficult to reduce the size of the optical system.

Inequality (4) may be replaced with inequality (4a) below:

$$0.70 < Rdc/Re < 0.92 \tag{4a}$$

Inequality (4) may be replaced with inequality (4b) below:

$$0.60 < Rdc/Re < 0.90 \tag{4b}$$

The DOE 1 is generally configured such that the array pitch decreases from the center of the optical axis to the periphery. Therefore, making weaker the power at the periphery than the power at the center of the optical axis can widen the interval Pout between the annular ends in the D-cut portion. The following inequality (5) may be satisfied:

$$0.8 < 1000 \times (R2^2 - R1^2)/(Re \times Pmin) < 2.4 \tag{5}$$

where R1 (mm) is a radius of the first annulus counting from the optical axis O (center of the annuli), and R2 (mm) is a radius of the second annulus counting from the optical axis O.

In inequality (5), $(R2^2-R1^2)/(2\times Re)$ indicates the minimum value (mm) of the array pitch in the periphery in a case where the power at the center of the optical axis (paraxial power) is extended. That is, inequality (5) indicates a ratio between the minimum value of the array pitch in the periphery when the power of the optical axis O (center) is extended and the minimum value of the actual array pitch. In a case where the value becomes higher than the upper limit of inequality (5), the minimum value of the array pitch in the periphery becomes small and the moldability in the D-cut portion lowers. In a case where the value becomes lower than the lower limit of inequality (5), the minimum value of the array pitch becomes wide, and chromatic aberration in the optical system cannot be sufficiently corrected.

Inequality (5) may be replaced with inequality (5a) below:

$$1.1 < 1000\times\left(R2^2 - R1^2\right)/(Re\times P\mathrm{min}) < 2.3 \tag{5a}$$

Inequality (5) may be replaced with inequality (5b) below:

$$1.3 < 1000\times\left(R2^2 - R1^2\right)/(Re\times P\mathrm{min}) < 2.2 \tag{5b}$$

The following inequality (6) may be satisfied:

$$0.40 < fd\times\lambda0/(Re\times P\mathrm{min}) < 1.20 \tag{6}$$

where λ0 (μm) is a design wavelength of the DOE 1, and fd (mm) is a focal length on the diffractive surface. Satisfying inequality (6) can provide an effect similar to that described in relation to inequality (5).

In a case where the value becomes higher than the upper limit of inequality (6), the minimum value of the array pitch in the periphery becomes small and the moldability in the D-cut portion lowers. In a case where the value becomes lower than the lower limit of inequality (6), the minimum value of the array pitch becomes wide, and chromatic aberration in the optical system cannot be sufficiently corrected.

Inequality (6) may be replaced with inequality (6a) below:

$$0.55 < fd\times\lambda0/(Re\times P\mathrm{min}) < 1.15 \tag{6a}$$

Inequality (6) may be replaced with inequality (6b) below:

$$0.65 < fd\times\lambda0/(Re\times P\mathrm{min}) < 1.10 \tag{6b}$$

In the DOE according to this example, an area that satisfies the following inequality (7) can properly control the minimum value of the array pitch:

$$-5.0 < (\Psi2(h) - 2\times C_2)/C_2 < -0.5 \tag{7}$$

where h (mm) is a distance in the direction perpendicular to the optical axis O, Ψ2(h) is a second (order) derivative value of the optical path difference function Ψ on the diffractive surface with respect to the distance h expressed by equation (d), and $C_2$ is a second-order phase coefficient. (Ψ2(h)−2× $C_2$) means a higher-order component of $h^4$ or higher of the second-order differential value Ψ2(h) of the optical path difference function Ψ(h). Ψ2(h) is given by the following equation:

$$\Psi2(h) = 2\times C_2 + 12\times C_4 h^2 + 30\times C_6 h^4 \tag{i}$$

As illustrated in equation (i) and inequality (7), in the case of a DOE that has no high-order phase coefficients $C_4$, $C_6$, . . . , etc. and has only the phase coefficient $C_2$ for paraxial $h^2$, inequality (7) has a value fixed to 0. In a case where inequality (7) has a negative value, it means that the power is relaxed in the periphery of the DOE 1 than that in the paraxial area, that is, the pitch is widened.

Figure 6:
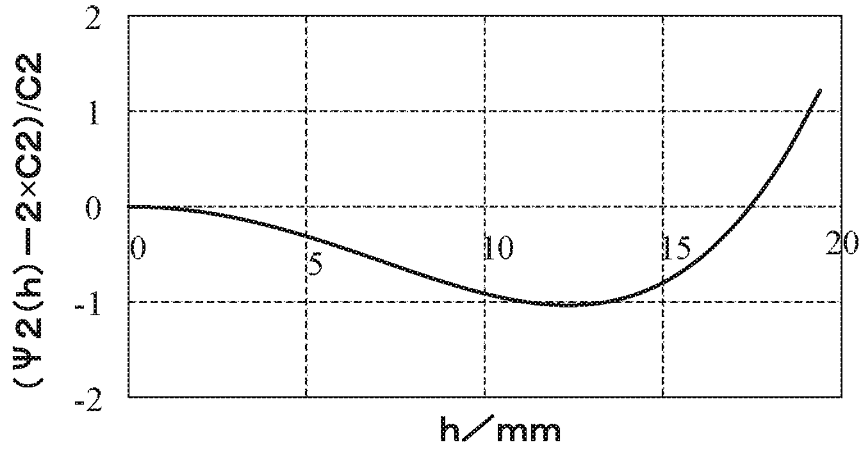
FIG. 6 explains the phase shape of the DOE according to Example 1.

FIG. 6 explains the phase shape of the DOE according to this example, and illustrates the value of inequality (7) relative to the distance h in the direction perpendicular to the optical axis O. In FIG. 6, the horizontal axis represents distance h (mm), and the vertical axis represents Ψ2(h)−2× C2)/C2, respectively. As illustrated in FIG. 6, the area that satisfies inequality (7) can properly adjust the pitch width in the D-cut portion.

Inequality (7) may be replaced with inequality (7a) below:

$$4.5 < (\Psi2(h) - 2\times C_2)/C_2 < -0.6 \tag{7a}$$

Inequality (7) may be replaced with inequality (7b) below:

$$-4.0 < (\Psi2(h) - 2\times C_2)/C_2 < -0.7 \tag{7b}$$

As described above, the DOE according to this example has a structure in which diffraction gratings made of two different materials are layered, thereby achieving high diffraction efficiency over the entire visible range. However, the grating height that is several times as high as a single-layer diffraction grating in the case of the DOE using the two different materials is a disadvantageous configuration in terms of molding and molding release.

Therefore, in order to improve the moldability in the D-cut portion, it is necessary to properly set the relationship between the grating height and pitch of the diffraction grating. The following inequality (8) may be satisfied:

$$0.05 < Dm/P\mathrm{min} < 1.00 \tag{8}$$

where Pmin (μm) is a minimum value of the array pitch of the DOE, and Dm (μm) is a grating height in the annulus having the minimum value Pmin.

In a diffraction grating in which an angle is formed between the grating wall surface and the envelope connecting the vertex portions of the diffraction grating, the grating height Dm in inequality (8) has a value corresponding to the distance d1t between the envelope that connects the vertex portions of diffraction gratings and the grating vertex as illustrated in FIG. 2. As the value becomes higher than the upper limit of inequality (8), the ratio of the grating height to the pitch becomes high and moldability becomes difficult. In a case where the value becomes lower than the lower limit of inequality (8), the minimum value of the array pitch becomes wider and the optical system cannot sufficiently correct chromatic aberration, or the grating height becomes too low and it becomes difficult to obtain good diffraction efficiency.

Inequality (8) may be replaced with inequality (8a) below:

$$0.07 < Dm/P\min < 0.80 \tag{8a}$$

Inequality (8) may be replaced with inequality (8b) below:

$$0.10 < Dm/P\min < 0.70 \tag{8b}$$

Bringing the shortest distance Rdc (mm) from the center of the annuli closer to the radius RPm (mm) of the annulus having the minimum value of the array pitch can increase the interval Pout between the annular ends at the D-cut portion. At this time, the following inequality (9) may be satisfied:

$$0.70 < Rdc/RPm < 1.50 \tag{9}$$

Inequality (9) may be replaced with inequality (9a) below:

$$0.72 < Rdc/RPm < 1.40 \tag{9a}$$

Inequality (9) may be replaced with inequality (9b) below:

$$0.75 < Rdc/RPm < 1.30 \tag{9b}$$

In the DOE according to this example, the minimum interval $Pou^{tm}$ between the annular ends in the D-cut portion is 84.2 μm. That is, properly setting the shape of the D-cut portion and the pitch of the DOE 1 can widen the minimum interval $Pou^{tm}$ between the annular ends in the D-cut portion, and provide the configuration with excellent moldability.

In the DOE according to this example, the following inequality (10) may be satisfied:

$$1.5 < Pou^{tm}/P\min < 6.0 \tag{10}$$

where Pout (μm) is an interval between the adjacent annular ends of the annulus in which the circumference is partially cut, and $Pou^{tm}$ (μm) is a minimum value of the interval Pout.

In order to satisfy inequality (10), the D-cut portion and the outermost annulus may be connected with a gentle curve. Satisfying inequality (10) can relatively widen the interval Pout between the annular ends in the D-cut portion, and improve moldability.

Inequality (10) may be replaced with inequality (10a) below:

$$1.7 < Pou^{tm}/P\min < 5.5 \tag{10a}$$

Inequality (10) may be replaced with inequality (10b) below:

$$2.0 < Pou^{tm}/P\min < 5.0 \tag{10b}$$

In the DOE according to this example, the outermost annulus is an annulus in which the circumference is partially cut, and the following inequality (11) may be satisfied:

$$3.0 < Lae/\mathrm{Re} < 6.0 \tag{11}$$

where Lae (mm) is a length of the arc in the outermost annulus.

In a case where the value becomes higher than the upper limit of inequality (11), the distance Rdc from the center of the annuli to the D-cut portion (an annulus in which the circumference is partially cut) becomes large, and it becomes difficult to reduce the size of the optical system or the DOE. In a case where the value becomes lower than the lower limit of inequality (11), the distance Rdc from the center of the annuli to the D-cut portion becomes small, the minimum interval $Pou^{tm}$ between the annular ends becomes small, and moldability lowers. Alternatively, the disconnected area of the annulus becomes larger, and processing of the mold becomes difficult.

Inequality (11) may be replaced with inequality (11a) below:

$$4.0 < Lae/\mathrm{Re} < 5.5 \tag{11a}$$

Inequality (11) may be replaced with inequality (11b) below:

$$4.2 < Lae/\mathrm{Re} < 5.2 \tag{11b}$$

The following inequality (12) may be satisfied:

$$150 < NR < 800 \tag{12}$$

where NR is the number of annuli in the plurality of annuli in the DOE according to this example.

In a case where the value becomes lower than the lower limit of inequality (12), the effect of correcting chromatic aberration by the DOE decreases, and it becomes difficult to correct various aberrations of the optical system. In a case where the value becomes higher than the upper limit of inequality (12), the pitch becomes smaller, moldability lowers in the D-cut portion, and it becomes difficult to create a diffraction grating mold.

Inequality (12) may be replaced with inequality (12a) below:

$$170 < NR < 670 \quad (12a)$$

Inequality (12) may be replaced with inequality (12b) below:

$$200 < NR < 550 \quad (12b)$$

The following inequality (13) may be satisfied:

$$20 < Ndc < 300 \quad (13)$$

where Ndc is the number of annuli having a radius larger than the distance Rdc and smaller than the radius Re among the plurality of annuli in the DOE.

In a case where the value becomes lower than the lower limit of inequality (13), the outer shape becomes large and it becomes difficult to reduce the size of the optical system. In a case where the value becomes higher than the upper limit of inequality (13), the interval Pout between the annular ends in the D-cut portion becomes narrower.

Inequality (13) may be replaced with inequality (13a) below:

$$25 < Ndc < 250 \quad (13a)$$

Inequality (13) may be replaced with inequality (13b) below:

$$30 < Ndc < 200 \quad (13b)$$

In the DOE according to this example, the second diffraction grating 9 having a large volume is formed by injection molding. At this time, the direction of the gate portion and the direction of the D-cut portion be opposite to each other. That is, within the annular areas, the direction of the shortest length from the center of the annuli and the direction of the gate portion may be opposite to each other with respect to the annular rotation center.

As mentioned above, in the area where the annulus is partially cut, such as the D-cut portion and has a shape with a step relative to the outer circumferential shape, the fluidity of the resin lowers at that portion during molding. Therefore, if a disconnected portion of the annulus is located near the resin inlet (gate), the resin will not be firmly filled into the grating vertex portions and valleys at the disconnected portion of the annulus and the desired grating shape cannot be obtained.

In the DOE according to this example, the gate portion is disposed at the angle θ relative to the optical axis O illustrated in FIG. 5B of approximately 180 degrees. This is similarly applied to the subsequent examples. Therefore, the fluidity of the resin in the D-cut portion is high, and a DOE with a desired grating shape can be obtained.

Example 2

A description will be given of Example 2. The DOE according to this example is different from that of Example 1 in that the material of each lens or the shape of the grating is changed. The basic configuration of the DOE according to this example is the same as that of Example 1, as illustrated in FIGS. 1A, 1B, and 2.

In this example, a first material of the first diffraction grating 8 is an episulfide resin (Nd=1.6630, νd=36.8, θgF=0.583). A second material of the second diffraction grating 9 is a polycarbonate thermoplastic resin (Nd=1.5880, νd=28.3, θgF=0.619). In this example, phase coefficients illustrated in equation (c) are $C_2$=−4.673E-04, $C_4$=−5.980E-07, $C_6$=2.100E-09, and a focal length fd on the diffractive surface is 1070 mm, and a radius Re of the outermost annulus is 18.38 mm.

Similarly to Example 1, the DOE according to this example has a structure in which the annulus has a D-cut outline and the annulus is partially cut. Within the annular area of the DOE according to this example, the shortest distance Rdc from the center of the annuli is 16.0 mm.

Figure 7:
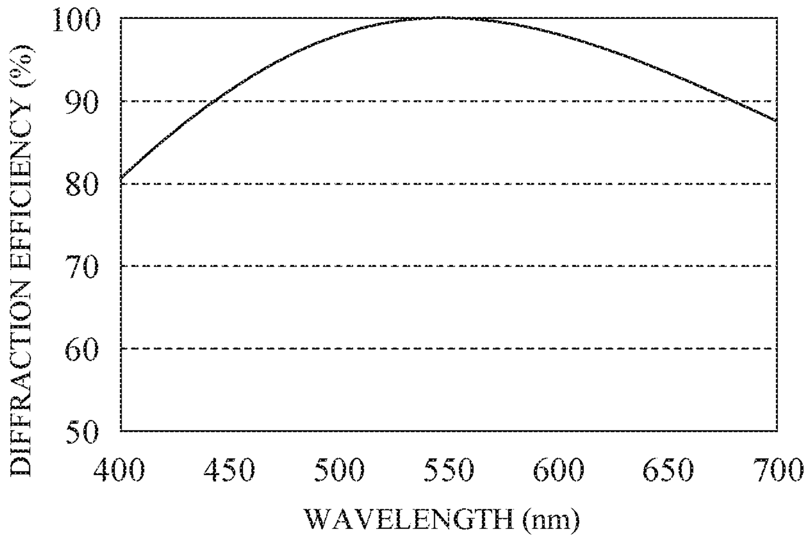
FIG. 7 illustrates a relationship between diffraction efficiency and wavelength in Example 2.

FIG. 7 illustrates the diffraction efficiency of the DOE according to this example in which the annulus having the minimum value of the array pitch Pmin is 45.6 μm and the grating height d1 is 7.46 μm. In FIG. 7, the horizontal axis represents a wavelength (nm), and the vertical axis represents diffraction efficiency (%). At this time, an angle formed between the envelope connecting the vertex portions of the diffraction grating on the grating wall surfaces and the perpendicular is 8.9 degrees and d1t is 7.27 μm. As illustrated in FIG. 7, the configuration that satisfies inequality (2) can provide high diffraction efficiency in a wide visible wavelength range.

Figure 8:
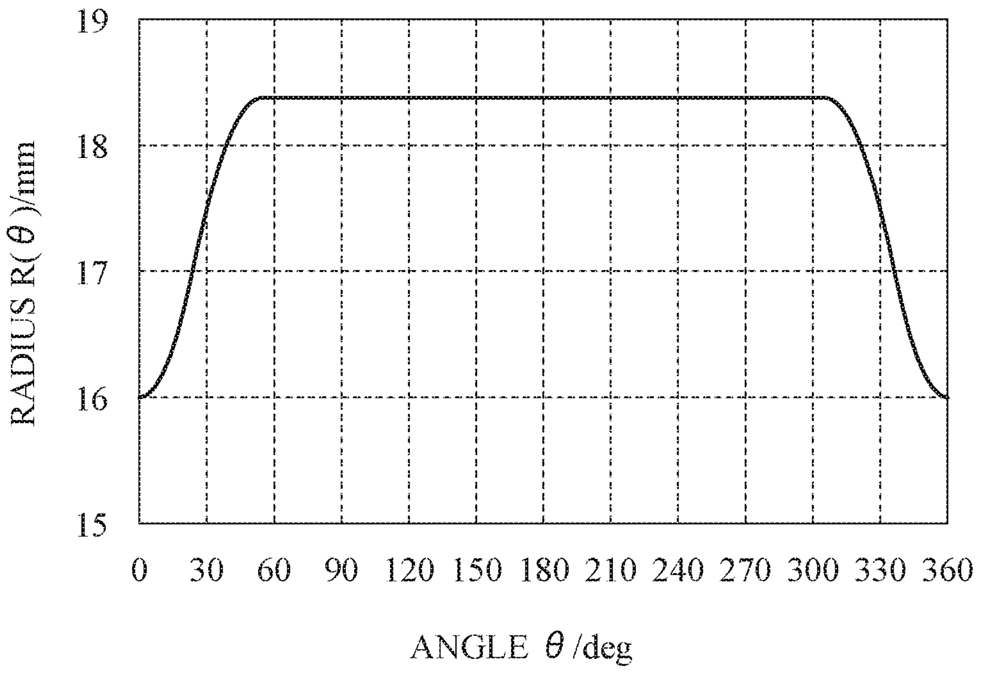
FIG. 8 illustrates the outline of the DOE according to Example 2.

FIG. 8 illustrates the distance (radius R) from the center of the annuli of the outline of the DOE according to this example as a function of the angle θ relative to the optical axis O. In FIG. 8, the horizontal axis represents the angle θ (deg), and the vertical axis represents the radius R (mm). As illustrated in FIG. 8, the DOE according to this example can reduce the size of the optical system by shortening the outer diameter around θ=0 degrees.

Figure 9:
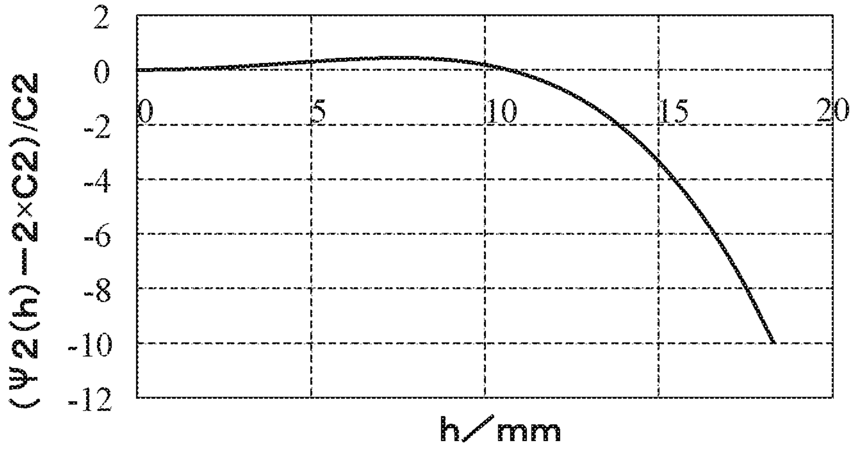
FIG. 9 explains the phase shape of the DOE according to Example 2.

FIG. 9 illustrates the second derivative value Ψ2(h) of the higher-order optical path difference function of inequality (7) with respect to the distance h in the direction perpendicular to the optical axis O in the DOE according to this example. In FIG. 9, the horizontal axis represents h (mm), and the vertical axis represents Ψ2(h). As illustrated in FIG. 9, the DOE according to this example has a structure in which the power due to the diffraction in the periphery is properly controlled. The DOE according to this example has the minimum interval $Pou^{tm}$ between the annular ends in the D-cut portion of a large value of 211.9 μm, and a structure with excellent moldability.

Example 3

A description will be given of Example 3. The DOE according to this example is different from that of Example 1 in that the material of each lens or the shape of the grating is changed. The basic configuration of the DOE according to this example is the configuration illustrated in FIGS. 1A, 1B, and 2, similarly to Example 1.

In this example, a first material of the first diffraction grating 8 is an enethiol resin (Nd=1.6430, νd=36, θgF=0.584). A second material of the second diffraction grating 9 is a polycarbonate thermoplastic resin (Nd=1.5880, νd=28.3, θgF=0.619). In this example, phase coefficients illustrated in equation (c) are $C_2$=−4.875E-04, $C_4$=−7.967E-07, $C_6$=1.890E-09, a focal length fd on the diffractive surface is 1026 mm, and a radius Re of the outermost annulus is 19.78 mm.

Similarly to Example 1, the DOE according to this example has a structure in which the annulus has a D-cut outline, and the annulus is partially cut. Within the annular area of the DOE according to this example, the shortest distance Rdc from the center of the annuli is 17.0 mm.

Figure 10:
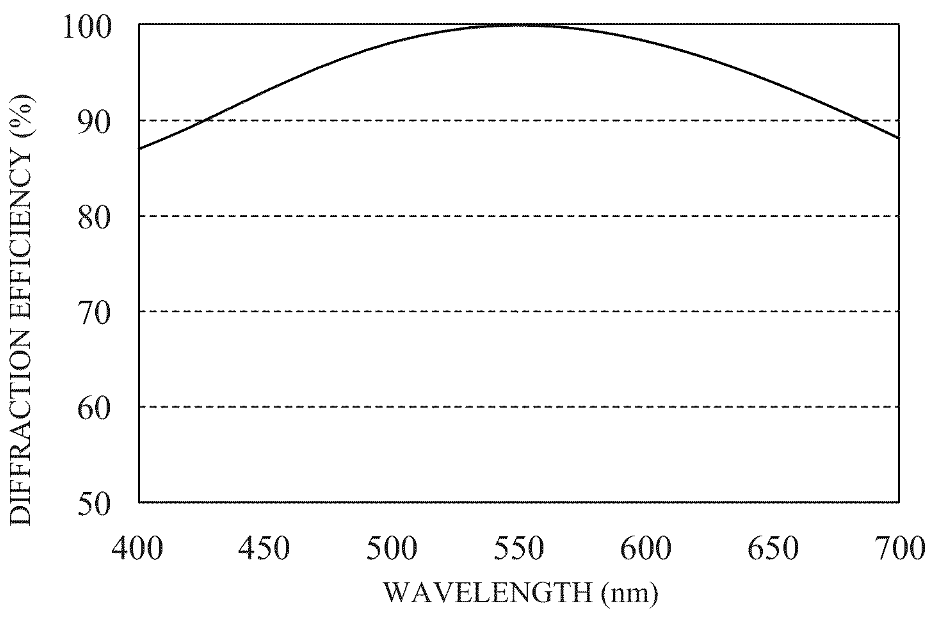
FIG. 10 illustrates a relationship between diffraction efficiency and wavelength in Example 3.

FIG. 10 illustrates the diffraction efficiency of the DOE according to this example in which the annulus having the minimum value of the array pitch Pmin is 33.9 μm and the grating height d1 is 10.57 km. In FIG. 10, the horizontal axis represents a wavelength (nm), and the vertical axis represents diffraction efficiency (%). At this time, an angle formed between the envelope connecting the vertex portions of the diffraction grating on the grating wall surfaces and the perpendicular is 12.1 degrees and d1t is 9.90 μm. As illustrated in FIG. 10, the configuration that satisfies inequality (2) can provide high diffraction efficiency in a wide visible wavelength range.

Figure 11:
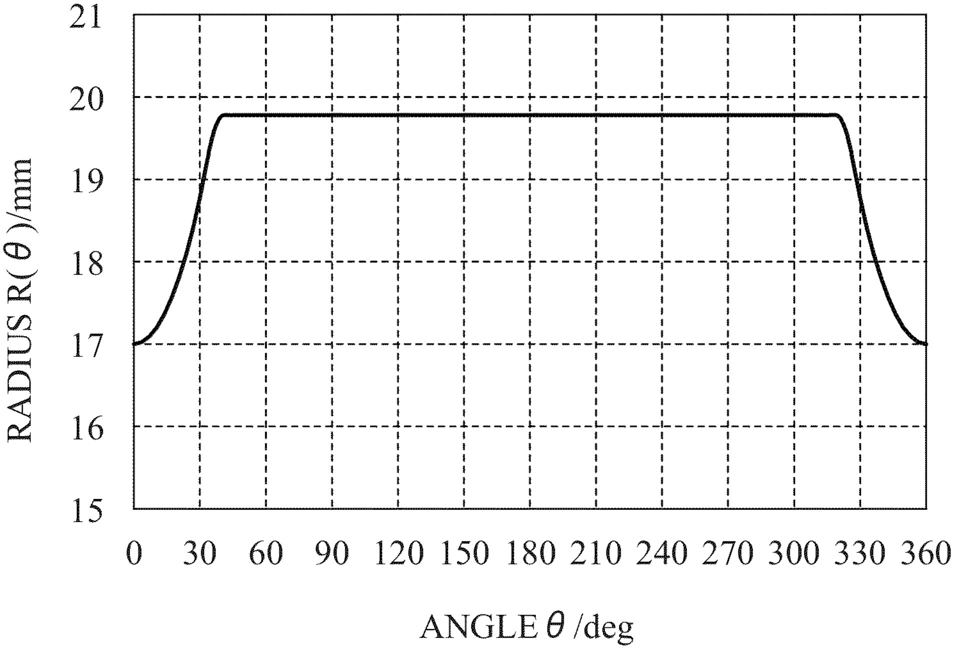
FIG. 11 illustrates the outline of the DOE according to Example 3.

FIG. 11 illustrates the distance (radius R) from the center of the annuli of the outline of the DOE according to this example as a function of the angle θ relative to the optical axis O. In FIG. 11, the horizontal axis represents the angle θ (deg), and the vertical axis represents the radius R (mm). As illustrated in FIG. 11, the DOE according to this example reduces the size of the optical system by shortening the outer diameter around θ=0 degrees.

Figure 12:
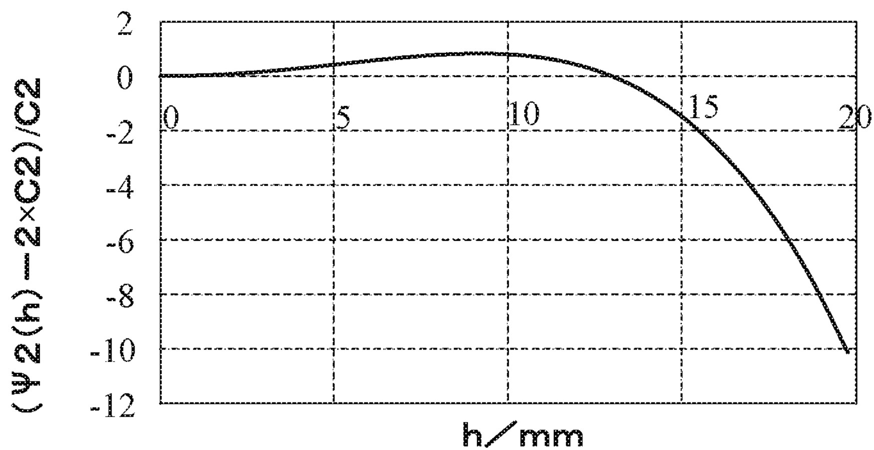
FIG. 12 explains the phase shape of the DOE according to Example 3.

FIG. 12 illustrates the second derivative value Ψ2(h) of the higher-order optical path difference function of inequality (7) with respect to the distance h in the direction perpendicular to the optical axis O in the DOE according to this example. In FIG. 12, the horizontal axis represents h (mm), and the vertical axis represents Ψ2(h). As illustrated in FIG. 12, the DOE according to this example has a structure in which the power due to diffraction in the periphery is properly controlled. The DOE according to this example has the minimum interval $Pou^{tm}$ between the annular ends in the D-cut portion of a large value of 110.1 μm, and a structure with excellent moldability.

Example 4

A description will be given of Example 4. The DOE according to this example is different from that of Example 1 in that the material of each lens or the shape of the grating is changed. The basic configuration of the DOE according to this example is the configuration illustrated in FIGS. 1A, 1B, and 2, similarly to Example 1.

In this example, a first material of the first diffraction grating 8 is an episulfide resin (Nd=1.6630, νd=36.8, θgF=0.583). A second material of the second diffraction grating 9 is a polycarbonate thermoplastic resin (Nd=1.616, νd=25.8, θgF=0.623). In this example, phase coefficients illustrated in equation (c) are $C_2$=−8.753E-04, $C_4$=1.186E-06, $C_6$=−2.150E-09, a focal length fd on the diffractive surface is 571 mm, and a radius Re of the outermost annulus is 18.52 mm.

Similarly to Example 1, the DOE according to this example has a structure in which the annulus has a D-cut outline, and the annulus is partially cut. Within the annular area of the DOE according to this example, the shortest distance Rdc from the center of the annuli is 15.0 mm.

Figure 13:
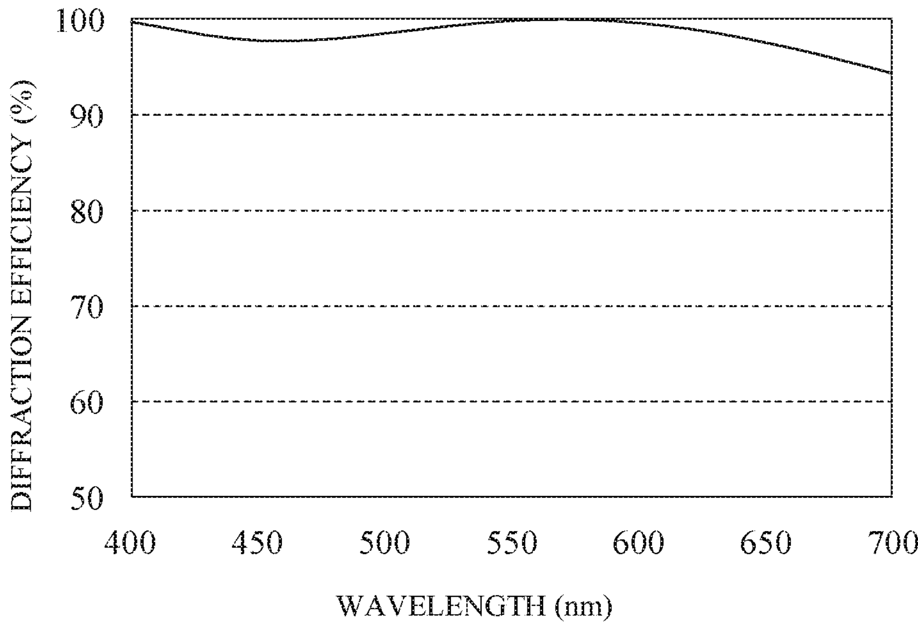
FIG. 13 illustrates a relationship between diffraction efficiency and wavelength in Example 4.

FIG. 13 illustrates the diffraction efficiency of the DOE according to this example in which the annulus having the minimum value of the array pitch Pmin is 19.4 μm and the grating height d1 is 12.96 μm. In FIG. 13, the horizontal axis represents a wavelength (nm), and the vertical axis represents diffraction efficiency (%). At this time, an angle formed between the envelope connecting the vertex portions of the diffraction grating on the grating wall surfaces and the perpendicular is 5.4 degrees and d1t is 12.18 μm. As illustrated in FIG. 13, the configuration that satisfies inequality (2) can provide high diffraction efficiency in a wide visible wavelength range.

Figure 14:
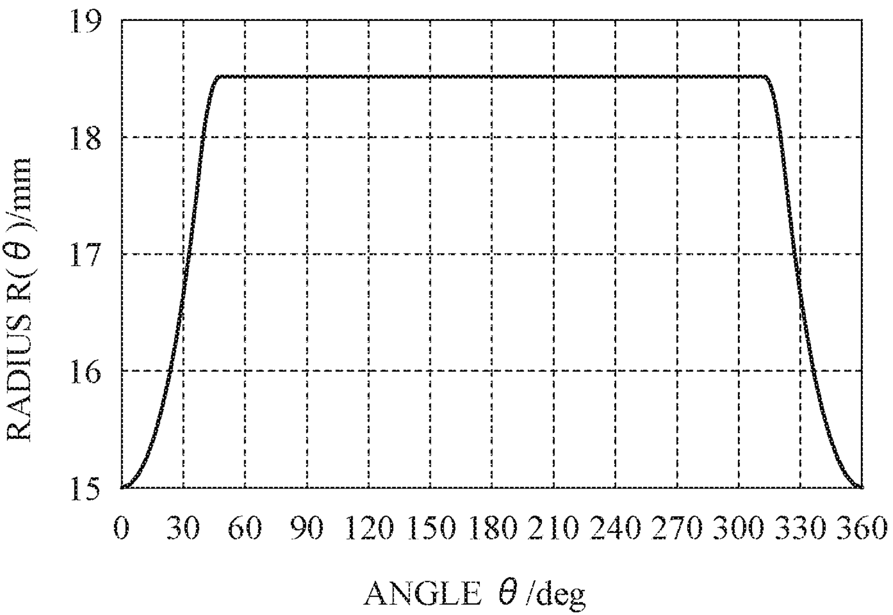
FIG. 14 illustrates the outline of the DOE according to Example 4.

FIG. 14 illustrates the distance (radius R) from the center of the annuli of the outline of the DOE according to this example as a function of the angle θ relative to the optical axis O. In FIG. 14, the horizontal axis represents the angle θ (deg), and the vertical axis represents the radius R (mm). As illustrated in FIG. 14, the DOE according to this example reduces the size of the optical system by shortening the outer diameter around θ=0 degrees.

Figure 15:
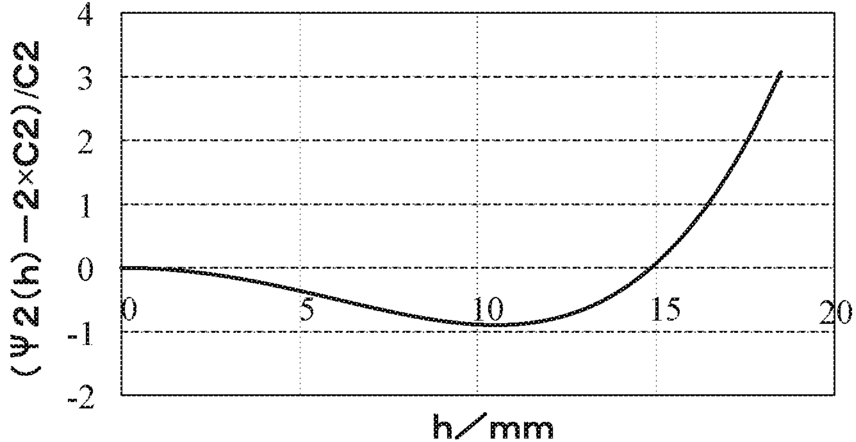
FIG. 15 explains the phase shape of the DOE according to Example 4.

FIG. 15 illustrates the second derivative value Ψ2(h) of the high-order optical path difference function of inequality (7) with respect to the distance h in the direction perpendicular to the optical axis O in the DOE according to this example. In FIG. 15, the horizontal axis represents h (mm), and the vertical axis represents Ψ2(h). As illustrated in FIG. 15, the DOE according to this example has a structure in which the power due to diffraction in the periphery is properly controlled. The DOE according to this example has the minimum interval $Pou^{tm}$ between the annular ends in the D-cut portion of a large value of 46.6 μm, and a structure with excellent moldability.

Table 1 summarizes values corresponding to each inequality for each of numerical examples 1 to 4 corresponding to Examples 1 to 4.

TABLE 1

| | NUMERICAL EXAMPLE | | | |
|---|---|---|---|---|
| | 1 | 2 | 3 | 4 |
| N1 | 1.6731 | 1.6630 | 1.6430 | 1.6630 |
| N2 | 1.6160 | 1.5880 | 1.5880 | 1.6160 |
| N1 − N2 | 0.057 | 0.075 | 0.055 | 0.047 |
| ν1 | 36.4 | 36.8 | 36.0 | 36.8 |
| ν2 | 25.8 | 28.3 | 28.3 | 25.8 |
| 式 (2) | 5.0 | 9.2 | 7.3 | 4.0 |
| Pmin | 21.0 | 45.6 | 33.9 | 19.4 |
| Rdc | 17.0 | 16.0 | 17.0 | 15.0 |
| Re | 19.40 | 18.38 | 19.78 | 18.52 |
| 式 (3) | 18.4 | 39.7 | 29.1 | 15.7 |
| Rdc/Re | 0.88 | 0.87 | 0.86 | 0.81 |
| R1 | 0.80 | 1.12 | 1.15 | 0.82 |
| R2 | 1.13 | 1.58 | 1.62 | 1.16 |
| 式 (5) | 1.56 | 1.49 | 1.96 | 1.88 |
| fd | 539 | 1070 | 1026 | 571 |
| 式 (6) | 0.78 | 0.75 | 0.90 | 0.94 |
| Dm | 9.96 | 7.27 | 9.90 | 12.18 |
| Dm/Pmin | 0.48 | 0.16 | 0.29 | 0.63 |
| RPm | 19.40 | 13.86 | 16.06 | 18.52 |
| Rdc/RPm | 0.88 | 1.15 | 1.06 | 0.81 |
| Poutm | 84.2 | 211.9 | 110.1 | 46.6 |
| Poutm/ Pmin | 4.02 | 4.64 | 3.25 | 2.41 |
| Lae | 87.0 | 80.4 | 95.9 | 85.5 |
| Lae/Re | 4.49 | 4.37 | 4.85 | 4.61 |
| NR | 466 | 247 | 342 | 421 |
| Ndc | 103 | 37 | 72 | 147 |

Example 5

Figure 16:
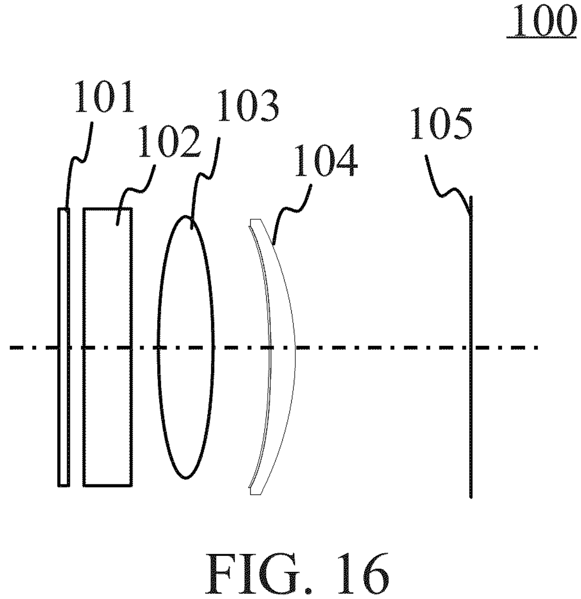
FIG. 16 is a configuration diagram of an optical system having the DOE according to each example.

Referring now to FIG. 16, a description will be given of an optical system (observation optical system) 100 according to Example 5. FIG. 16 is a configuration diagram of the optical system 100. In FIG. 16, reference numeral 101 denotes a display panel such as an LCD, reference numeral 102 denotes an optical path branching unit, reference numeral 103 denotes a correction lens, and reference numeral 105 denotes a pupil surface or plane. Reference numeral 104 denotes a DOE according to any one of Examples 1 to 4, which is provided to correct chromatic aberration of the correction lens 103 and the like.

As described in each of the above examples, the optical system 100 has a structure that has high diffraction efficiency, is easy to manufacture, and is less expensive. The optical system 100 is applicable to an observation optical system such as a ground telescope or an astronomical observation telescope, an observation optical system for a head mount display (HMD), and an optical viewfinder such as a lens shutter camera or a video camera, and exhibits effects similar to those described above. In this example, one DOE is disposed in the optical system 100, but the embodiment is not limited to this example, and a plurality of DOEs may be disposed in the imaging lens.

Example 6

Figure 17:
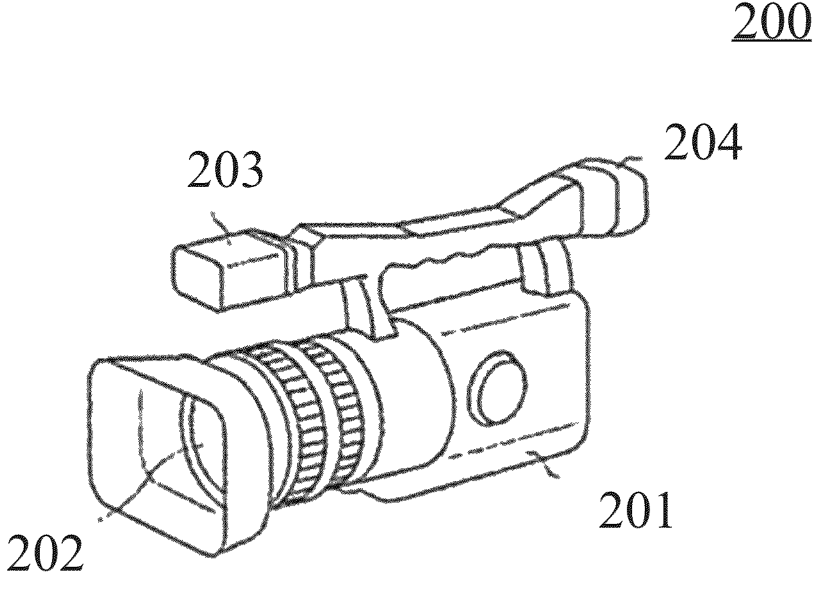
FIG. 17 is a schematic diagram of an image pickup apparatus having the DOE according to any one of the examples.

Referring now to FIG. 17, a description will be given of an image pickup apparatus (video camera) 200 according to Example 6. FIG. 17 is a schematic diagram of the image pickup apparatus 200. In FIG. 17, reference numeral 201 denotes a video camera body, reference numeral 202 denotes an imaging optical system configured to form an object image on an unillustrated image sensor, and reference numeral 203 denotes a sound collecting microphone. Reference numeral 204 denotes an observation apparatus (electronic viewfinder, display apparatus) for enabling the user to observe an object image displayed on an unillustrated display element via an observation optical system, such as the optical system 100 according to Example 5. The observation apparatus guides light from the display element for displaying an image. The display element includes a liquid crystal panel or the like, and the object image formed by the imaging optical system 202 is displayed on the display element.

Thus, the optical system 100 according to Example 5 can be applied to the image pickup apparatus 200 such as a video camera. This example provides the image pickup apparatus 200 having an eyepiece optical system (observation optical system) that can secure sufficient space for the optical path branching unit 102 in the optical system 100, have a wide viewing angle, sufficiently correct various aberrations such as curvature of field and astigmatism. The eyepiece optical system according to this example is applicable not only to the video camera illustrated in FIG. 17 but also, for example, to a lens interchangeable type mirrorless camera and HMD.

Each example can provide a high-performance and compact DOE with excellent moldability. Using the DOE according to each example for an optical system can provide an optical system, an image pickup apparatus, and a display apparatus in which various aberrations such as chromatic aberration and flare are satisfactorily reduced.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

Each example can provide a high-performance and compact DOE with excellent moldability.

This application claims the benefit of Japanese Patent Application No. 2023-010722, filed on Jan. 27, 2023, which is hereby incorporated by reference herein in its entirety.

What is claimed is:

1. A diffractive optical element comprising:

a diffractive area including annular sections concentrically arranged, wherein at least one of the annular sections has a non-circular shape, wherein the annular sections are rotationally symmetric and concentric, and wherein the following inequalities are satisfied:

$$6 < P\min \times Rdc/Re < 65$$

$$0.50 < Rdc/Re < 0.95$$

$$0.70 < Rdc/RPm < 1.50$$

where Rdc (mm) is a shortest one of distances from a center of the annular sections to an outer circumference of the diffractive area, Re (mm) is a radius of one of the annular sections which is farthest from the center, Pmin (μm) is a minimum value of an array pitch of the diffractive optical element, and RPm (mm) is a radius of the annulus having the minimum value Pmin.

2. The diffractive optical element according to claim 1, wherein the following inequality is satisfied:

$$0.8 < 1000 \times \left(R2^2 - R1^2\right) / (Re \times Pmin) < 2.4$$

where R1 (mm) is a radius of a first annulus counted from the center, and R2 (mm) is a radius of a second annulus counted from the center.

3. The diffractive optical element according to claim 1, wherein the following inequality is satisfied:

$$0.40 < fd \times \lambda 0/(Re \times P\min) < 1.20$$

where λ0 (μm) is a design wavelength of the diffractive optical element, and fd (mm) is a focal length on a diffractive surface.

4. The diffractive optical element according to claim 1, wherein the following inequality is satisfied:

$$0.05 < Dm/Pmin < 1.00$$

where Dm (μm) is a grating height in an annulus having the minimum value Pmin.

5. The diffractive optical element according to claim 1, wherein annular ends are points where an outer peripheral area intersects with each annular section, where the annular sections have a non-circular shape, and wherein the following inequality is satisfied:

$$1.5 < Pou^{tm}/Pmin < 6.0$$

where Pout (μm) is an interval between adjacent annular ends among the annular sections in which the circumference is non-circular, and $Pou^{tm}$ (μm) is a minimum value of the interval Pout.

6. The diffractive optical element according to claim 1, wherein an outermost annulus in the diffractive optical element has the circumference that is non-circular, and the following inequality is satisfied:

$$3.0 < Lae/Re < 6.0$$

where Lae (mm) is a length of an arc in the outermost annulus.

7. The diffractive optical element according to claim 1, wherein the following inequality is satisfied:

$$150 < NR < 800$$

where NR is the number of annuli in the annular sections.

8. The diffractive optical element according to claim 1, wherein the following inequality is satisfied:

$$20 < Ndc < 300$$

where Ndc is the number of annuli having a radius larger than the shortest distance Rdc and smaller than the radius Re among the annular sections.

9. The diffractive optical element according to claim 1, wherein an optical material of the diffractive optical element includes a thermoplastic resin.

10. The diffractive optical element according to claim 1, wherein the diffractive optical element includes layers of a first diffraction grating made of a first material, and a second diffraction grating made of a second material different from the first material.

11. The diffractive optical element according to claim 1, wherein the diffractive optical element has an outer circumferential area in which no diffraction grating is formed outside an annulus having the radius Re.

12. The diffractive optical element according to claim 1, wherein the following inequality is satisfied:

$$-5.0 < (\Psi 2(h) - 2 \times C_2)/C_2 < -0.5$$

where h (mm) is a distance in a direction perpendicular to an optical axis in the diffractive optical element, an optical path difference function Ψ of a diffractive surface is $\Psi(h)=C_2h^2+C_4h^4+C_6h^6 \ldots$, Ψ2(h) is a second derivative value of the optical path difference function Ψ with respect to h, and Ci is a phase coefficient (i=2, 4, 6 . . . ).

13. The diffractive optical element according to claim 1, wherein the diffractive optical element has a gate portion, and wherein in the diffractive area, a direction of a shortest length from the center and a direction of the gate portion are opposite to each other with respect to an annular rotation center.

14. An optical system comprising the diffractive optical element according to claim 1.

15. An image pickup apparatus comprising:

the optical system according to claim 14; and an image sensor configured to receive an optical image formed by the optical system.

16. A display apparatus comprising:

a display element configured to display an image; and the optical system according to claim 14 configured to guide light from the display element.

* * * * *